(12) United States Patent
Yamada et al.

(10) Patent No.: US 11,881,115 B2
(45) Date of Patent: Jan. 23, 2024

(54) FLIGHT VEHICLE MANAGEMENT APPARATUS

(71) Applicant: NTT DOCOMO, INC., Tokyo (JP)

(72) Inventors: Takefumi Yamada, Tokyo (JP); Youhei Oono, Tokyo (JP); Yuichiro Segawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 701 days.

(21) Appl. No.: 17/043,928

(22) PCT Filed: Mar. 25, 2019

(86) PCT No.: PCT/JP2019/012465
§ 371 (c)(1),
(2) Date: Sep. 30, 2020

(87) PCT Pub. No.: WO2019/194003
PCT Pub. Date: Oct. 10, 2019

(65) Prior Publication Data
US 2021/0125504 A1  Apr. 29, 2021

(30) Foreign Application Priority Data

Apr. 5, 2018 (JP) .................................. 2018-073032

(51) Int. Cl.
*G08G 5/00* (2006.01)
*B64F 1/36* (2017.01)
*H04W 48/04* (2009.01)
*H04W 52/38* (2009.01)

(52) U.S. Cl.
CPC ............... *G08G 5/003* (2013.01); *B64F 1/36* (2013.01); *G08G 5/0013* (2013.01); *H04W 48/04* (2013.01); *H04W 52/38* (2013.01)

(58) Field of Classification Search
CPC ...... G08G 5/003; G08G 5/0013; G08G 5/006; G08G 5/0069; G08G 5/0026; G08G 5/0034; G08G 5/0043; G08G 5/0082; B64C 39/024; B64U 70/00; B64U 10/13; B64U 2201/00; H04B 7/18506
See application file for complete search history.

(56) References Cited

U.S. PATENT DOCUMENTS 9,818,303 B2 *  11/2017  Kotecha ............... G08G 5/0034

OTHER PUBLICATIONS

International Search Report issued in corresponding PCT Application No. PCT/JP2019/012465, dated May 28, 2019, 3 pages.
3G99 LTE; Evolved Universal Terrestrial Radio Access (E-UTRA); Physical layer procedures (3GPP TS 36.213 version 14.2.0 Release 14) (Apr. 2017); 456 pp.
LTE; Evolved Universal Terrestrial Radio Access (E-UTRA); Physical layer procedures (3GPP TS 36.213 version 14.2.0 Release 14) (Apr. 2017); 456 pp.

* cited by examiner

*Primary Examiner* — Shon G Foley
(74) *Attorney, Agent, or Firm* — DILWORTH IP, LLC (57) ABSTRACT

Assignment unit assigns flight vehicles having radio communication apparatuses to airspaces. At this time, assignment unit limits the assignment of flight vehicle to a specified airspace in which a parameter specified by specification unit is in a predetermined range (e.g., an airspace in which the path loss of the physical downlink channel to radio communication apparatus is less than or equal to a threshold value).

10 Claims, 4 Drawing Sheets

FLIGHT VEHICLE MANAGEMENT APPARATUS

TECHNICAL FIELD

The present invention relates to technology according to which an airspace for the flight of a flight vehicle is assigned to the flight vehicle.

BACKGROUND

In order to achieve faster speeds than in Long Term Evolution (LTE), the 3rd Generation Partnership Project (3GPP) has created the LTE-Advanced (hereinafter, the term "LTE" includes LTE-Advanced) standard. The 3GPP is also reviewing specifications for a system called 5G (5th generation mobile communication system) or the like as a successor to LTE.

Under LTE, it is defined that the transmit power of a physical uplink channel is controlled based on the path loss between a radio base station (eNB) and a radio communication apparatus (UE). Specifically, it is defined that the transmit power of the physical uplink shared channel (specifically, PUSCH: Physical Uplink Shared Channel) is controlled based on the path loss of the physical downlink channel (e.g., see 3G99 LTE: Evolved Universal Terrestrial Radio Access (E-UTRA); Physical layer procedures (3GPP TS 36.213 version 14.2.0 Release 14 (2017-04); 456 pp.).

There are also radio communication apparatuses (hereinafter called specified radio communication apparatuses) that carry out communication in the sky, where the line-of-sight is good in all directions, rather than on the ground, as with radio communication apparatuses provided in unmanned flight vehicles called drones.

With such specified radio communication apparatuses, the path loss of the physical downlink channel is smaller because the line-of-sight is good. Also, a specified radio communication apparatus is highly likely to carry out communication at a position where it is possible to detect multiple cells in which the aforementioned path loss is small. In other words, because a specified radio communication apparatus has a good line-of-sight, a radio base station that forms a cell that does not include the specified radio communication apparatus (i.e., an out-zone cell) may in some cases receive a signal having a very high signal level from the specified radio communication apparatus.

Current LTE specifications do not envision such communication performed in the sky by specified radio communication apparatuses. For this reason, based on the premise that a radio communication apparatus is located close to a radio base station if the aforementioned path loss is small, a high target reception quality (specifically a Target SIR) will be set in order to improve throughput. In order to satisfy a high set target reception quality, a radio communication apparatus generally executes control to raise the PUSCH transmit power.

However, when such control is executed in a specified radio communication apparatus, there is a possibility of causing interference in the cell that the specified radio communication apparatus is connected to, or neighboring cells formed in the vicinity of that cell. In other words, a specified radio communication apparatus, which has a good line-of-sight in all directions due to carrying out communication in the sky, has a higher possibility of causing interference in its own cell and neighboring cells than a normal radio communication apparatus that carries out communication on the ground for example. Also, in the case where frequency resources for allocation to radio communication apparatuses in cells on the physical uplink channel are divided and multiplexed based on time or frequency, interference is sometimes unlikely to occur even if the reception power from a specific radio communication apparatus is high at a radio base station, but if the reception power from some radio communication apparatuses is high, that can have negative influences such as impairing fairness among radio communication apparatuses when frequency resources are allocated.

The present invention was achieved in light of the foregoing circumstances, and an object of the present invention is to suppress the case where communication performed by a ground-based radio communication apparatus is negatively influenced when the ground-based radio communication apparatus and a radio communication apparatus provided in a flight vehicle are connected to the same radio base station.

SUMMARY OF INVENTION

In one aspect, the present invention provides a flight vehicle management apparatus including: a specification unit configured to specify, for each airspace, a parameter regarding a communication quality of a radio communication apparatus in a cell formed by a radio base station; and an assignment unit configured to, for each airspace, assign a flight vehicle including a radio communication apparatus as a flight vehicle that is to fly in the airspace, and to limit assignment of a flight vehicle to a specified airspace, the specified airspace being an airspace in which the parameter specified by the specification unit is in a predetermined range.

An aspect is possible in which the assignment unit assigns, to the specified airspace, a flight vehicle including a radio communication apparatus that has a function for limiting a transmit power of a physical uplink channel to a radio base station, and assigns a flight vehicle to an airspace other than the specified airspace regardless of whether or not the function is included.

An aspect is possible in which the assignment unit limits the number of flight vehicles that are assigned to the specified airspace to a greater extent than the number of flight vehicles that are assigned to an airspace other than the specified airspace.

An aspect is possible in which in a case where the number of, or a communication load of, radio communication apparatuses located in a cell that includes the specified airspace is less than or equal to a threshold value, the assignment unit relaxes the limiting of assignment of a flight vehicle or reduces the size of the specified airspace.

An aspect is possible in which the assignment unit relaxes the limiting of assignment of a flight vehicle or reduces the size of the specified airspace in a specified period.

An aspect is possible in which the specification unit specifies an airspace as the specified airspace based on the number of flight vehicles that have been assigned by the assignment unit to another airspace in a vicinity of the airspace.

An aspect is possible in which when performing the assignment, the assignment unit weights a flight vehicle in accordance with a parameter regarding a communication quality of a radio communication apparatus of the flight vehicle.

An aspect is possible in which the assignment unit relaxes the limiting of assignment of a flight vehicle to the specified airspace if the specified airspace is an airspace in which a radio communication apparatus of the flight vehicle can use a communication channel that is different from a radio communication apparatus that performs ground-based communication in the airspace.

An aspect is possible in which the assignment unit relaxes the limiting of assignment of a flight vehicle to the specified airspace if urgency is required.

An aspect is possible in which the assignment unit relaxes the limiting of assignment of a flight vehicle to the specified airspace if the specified airspace is an airspace through which the flight vehicle has a high need to pass.

According to the present invention, it is possible to suppress the case where communication performed by a ground-based radio communication apparatus is negatively influenced when the ground-based radio communication apparatus and a radio communication apparatus provided in a flight vehicle are connected to the same radio base station.

DETAILED DESCRIPTION

Configuration

Figure 1:
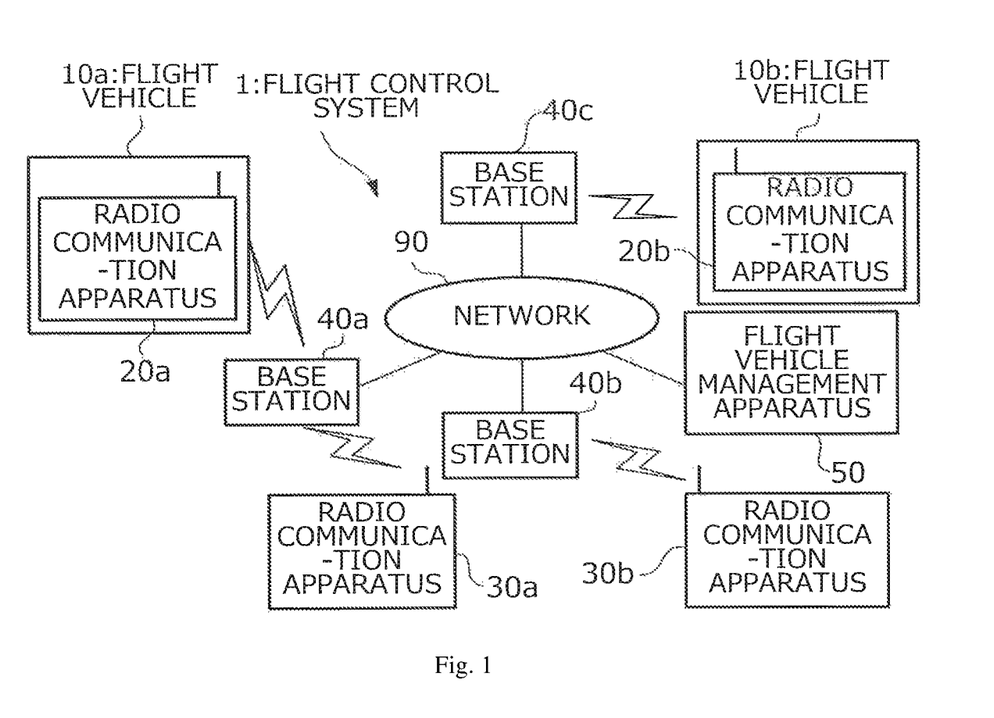
FIG. 1 is a block diagram showing an example of the configuration of flight control system 1, in accordance to the present invention.

FIG. 1 is a diagram showing an example of the configuration of flight control system 1. Flight control system 1 includes multiple flight vehicles 10a and 10b that are drones or the like, multiple radio communication apparatuses 20a and 20b that are provided in flight vehicles 10a and 10b, multiple radio communication apparatuses 30a and 30b for use by users on the ground, network 90 that includes radio base stations 40a, 40b, and 40c, and flight vehicle management apparatus 50 that is connected to network 90. Note that hereinafter, flight vehicles 10a and 10b will be collectively called flight vehicles 10, radio communication apparatuses 20a and 20b will be collectively called radio communication apparatuses 20, radio communication apparatuses 30a and 30b will be collectively called radio communication apparatuses 30, and radio base stations 40a, 40b, and 40c will be collectively called radio base stations 40.

Each flight vehicle 10 physically includes a computer, various sensors controlled by the computer, and a drive mechanism that includes motors, rotor blades, and the like, and the computer includes a CPU (Central Processing Unit), a ROM (Read Only Memory), a RAM (Random Access Memory), and an auxiliary storage apparatus, as well as a positioning unit for measuring the position of the flight vehicle, a communication IF (Interface) for connection to radio communication apparatuses 20, and the like. Flight vehicle 10 flies in the air by the computer controlling the drive mechanism in accordance with a flight plan or the like that has been assigned to flight vehicle 10 and includes airspace positions, passage times for such positions, and the like. Note that flight vehicle 10 need only being a flying apparatus, and is also called a UAS (Unmanned Aircraft System), for example.

A radio communication system is constructed by network 90 that includes radio communication apparatuses 20 and 30 and radio base stations 40. This radio communication system is a radio communication system that complies with LTE (Long Term Evolution) standards, for example. In LTE, radio communication apparatuses 20 and 30 are called UEs, and radio base stations 40 are called eNBs. The areas where radio communication can be performed with radio base stations 40 are called cells. Radio communication apparatuses 20 and 30 that are located in (in the zone of) a cell perform radio communication with radio base station 40 that forms that cell. For example, radio communication apparatus 30 used by a user located on the ground executes radio communication with radio base station 40 located on the ground. On the other hand, radio communication apparatus 20 provided in flight vehicle 10 executes radio communication with radio base station 40 both when on the ground and when in the air (e.g., an airspace with an altitude of 30 m or more).

Flight vehicle management apparatus 50 is an information processing apparatus that controls and manages the flight of flight vehicles 10. In the present embodiment, flight vehicle management apparatus 50 particularly has a feature in processing for assigning flight airspaces to flight vehicles 10. This assignment of airspaces to flight vehicles 10 refers to processing in which flight vehicle management apparatus 50 stores identification information of flight vehicles 10 in correspondence with identification information of airspaces for the flight thereof as flight plans for corresponding flight vehicles 10. Note that functions in flight vehicle operation control are generally distributed among multiple systems such as an FIMS (Flight Information Management System) and a UASSP (UAS Service Provider), and flight vehicle management apparatus 50 of present embodiment may be implemented using such systems, or may be implemented using any one of such systems. Also, some of the functions of flight vehicle management apparatus 50, such as the functions of later-described specification unit (airspace communication state detection function), may be implanted using an apparatus other than a general FIMS or UASSP.

Figure 2:
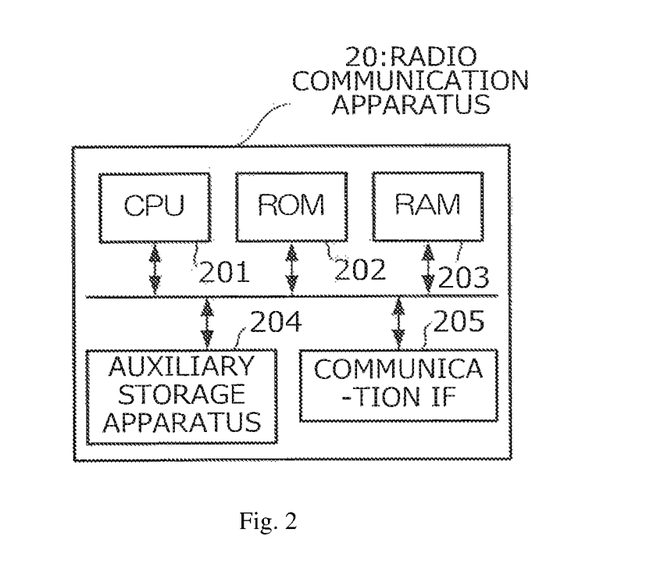
FIG. 2 is a block diagram showing the hardware configuration of radio communication apparatuses 20, in accordance to the present invention.

FIG. 2 is a block diagram showing the hardware configuration of radio communication apparatus 20. The radio communication apparatus includes at least CPU 201 (Central Processing Unit), ROM (Read Only Memory) 202, RAM (Random Access Memory) 203, auxiliary storage apparatus 204, and communication IF 205. CPU 201 is a processor that performs various types of computation. ROM 202 is a non-volatile memory that stores a program and data used when radio communication apparatus 20 starts up, for example. RAM 203 is a volatile memory that functions as a work area for when CPU 201 executes programs. Auxiliary storage apparatus 204 is a non-volatile storage apparatus such as an HDD (Hard Disk Drive) or an SSD (Solid State Drive), and stores programs and data used in radio communication apparatus 20. Communication IF 205 is an interface for performing communication via network 90 in compliance with LTE. Note that besides the constituent elements illustrated in FIG. 2, radio communication apparatus 20 may include other constituent elements such as a display unit, an operation unit, or an audio input/output unit. Also, the hardware configuration of radio communication apparatus 30 is similar to that of radio communication apparatus 20, and therefore will not be described.

Figure 3:
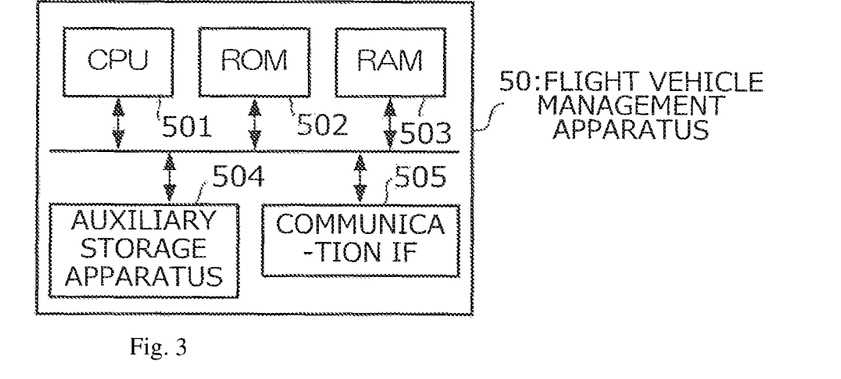
FIG. 3 is a block diagram showing the hardware configuration of flight vehicle management apparatus 50, in accordance to the present invention.
Figure 5:
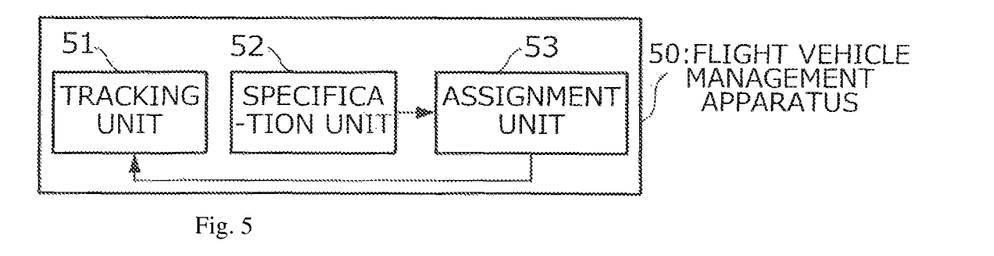
FIG. 5 is a block diagram showing the functional configuration of flight vehicle management apparatus 50, in accordance to the present invention.

FIG. 3 is a diagram showing the hardware configuration of flight vehicle management apparatus 50. Flight vehicle management apparatus 50 is a computer apparatus that includes CPU 501, ROM 502, RAM 503, auxiliary storage apparatus 504, and communication IF 505. CPU 501 is a processor that performs various types of computation. ROM 502 is a non-volatile memory that stores a program and data used when flight vehicle management apparatus 50 starts up, for example. RAM 503 is a volatile memory that functions as a work area for when CPU 501 executes programs. Auxiliary storage apparatus 504 is a non-volatile storage apparatus such as an HDD or an SSD, and stores programs and data used in flight vehicle management apparatus 50. Later-described functions shown in FIG. 5 are realized by CPU 501 executing such programs. Communication IF 505 is an interface for performing communication via network 90 in compliance with a predetermined communication standard. Note that besides the constituent elements illustrated in FIG. 3, flight vehicle management apparatus 50 may include other constituent elements such as a display unit or an operation unit.

The following describes communication interference that occurs in the radio communication system. As shown in FIG. 4(a), radio communication apparatus 20a is provided in flight vehicle 10 that flies in the air, and therefore has a good line-of-sight to connection-partner radio base station 40a (solid line arrow), and simultaneously has a good line-of-sight to radio base station 40b that is in the vicinity of radio base station 40a (dashed-dotted line arrow).

For this reason, in the case of radio communication apparatus 20a, the path loss of the physical downlink channel from radio base station 40a and the path loss of the physical downlink channel from radio base station 40b are both small. As previously described, under current LTE specifications, if the aforementioned path loss is small, a high Target SIR is set in order to improve the throughput, and radio communication apparatus 20a raises the PUSCH transmit power in order to satisfy the high Target SIR. As a result, radio communication apparatus 20a is a source of interference with radio base station 40b, which is not a connection partner, and is a source of negative influence on other radio communication apparatuses 30 located in the cell of radio base station 40a that is the connection partner.

In contrast, in the case of radio communication apparatus 30 that executes communication on the ground, even if the path loss of the physical downlink channel from radio base station 40 that is the connection partner is small, it is often the case that the line-of-sight to another radio base station 40 in the vicinity of connection-partner radio base station 40 is not good due to the existence of an obstructing object or the like. In this case, the path loss of the physical downlink channel from non-connection-partner radio base station 40 to radio communication apparatus 30 increases, and therefore the problem of interference described using FIG. 4(a) is not likely to occur.

Also, as shown in FIGS. 4(b) and 4(c), if radio communication apparatuses 20a and 20b provided in flight vehicles 10 are respectively connected to radio base stations 40a and 40b that are in the vicinity of each other, radio communication apparatuses 20a and 20b both continue to raise the transmit power until the Target SIR is satisfied, and can possibly cause a large amount of interference with each other. Note that in the states shown in FIGS. 4(b) and 4(c), radio communication apparatus 20a is connected to radio base station 40a (solid line arrow), and radio communication apparatus 20b is connected to radio base station 40b (solid line arrow). Furthermore, in the states shown in FIGS. 4(b) and 4(c), radio communication apparatus 20a is a source of interference with non-connection-partner radio base station 40b (dashed line arrow), and radio communication apparatus 20b is a source of interference with non-connection-partner radio base station 40a (dashed line arrow).

Furthermore, in the state shown in FIG. 4(c), the aforementioned radio communication apparatuses also cause interference with ground-based radio communication apparatus 30 that is connected to either radio base station 40a or 40b. Accordingly, there is a possibility that the physical uplink channel of ground-based radio communication apparatus 30 will be negatively influenced.

The configuration of the present embodiment suppresses the cases where ground-based radio communication apparatus 30 is negatively influenced by interference as described using FIG. 4(a). Note that the physical uplink channel mentioned here includes not only a PUSCH (Physical Uplink Shared Channel), but also a PUCCH (Physical Downlink Control Channel), and a PRACH (Physical Random Access Channel). Also, the physical uplink channel may be an NPUSCH for an MTC-UE.

FIG. 5 is a diagram showing an example of the functional configuration of flight vehicle management apparatus 50. Functions of the flight vehicle management apparatus 50 are realized by CPU 501 executing predetermined software (programs) to perform various types of computation, and controlling communication performed by communication IF 505 and the reading and/or writing of data from/to ROM 502, RAM 503, and auxiliary storage apparatus 504.

In FIG. 5, tracking unit 51 stores flight plans, and also records identification information and the flight status of each flight vehicle 10 that is under control of flight vehicle management apparatus 50. The flight status includes positions at which the corresponding flight vehicle 10 is flying, and date/times of such positions. These positions and times are transmitted from radio communication apparatus 20 of flight vehicle 10 to flight vehicle management apparatus 50 along with the identification information of flight vehicle 10 via network 90. Also, tracking unit 51 determines whether or not the position information and the date/time are within the flight plan of the corresponding flight vehicle 10, and, based on the determination result, gives flight instructions to flight vehicle 10 via network 90 as necessary.

For each airspace, specification unit 52 specifies a parameter regarding the communication quality of radio communication apparatuses 20 and 30 in the cell formed by the corresponding radio base station 40 (e.g., the path loss of the physical downlink channel from radio base station 40 to radio communication apparatuses 20 and 30). Each airspace is an airspace that has been defined in advance based on a predetermined reference, for example.

Assignment unit 53 determines flight airspaces that are to be assigned to flight vehicles 10. Specifically, assignment unit 53 performs processing for assigning flight vehicles 10 to airspaces. At this time, assignment unit 53 limits the assignment of flight vehicle 10 to an airspace in which the parameter specified by specification unit 52 is in a predetermined range indicating that there is a certain possibility or higher of exerting the previously described negative influence due to good communication quality (e.g., an airspace in which the path loss of the physical downlink channel to radio communication apparatus 20 is less than or equal to a threshold value, which will hereinafter be called a specified airspace). More specifically, if radio base station 40 has a good line-of-sight to the sky, that is to say, the path loss of the physical downlink channel to radio communication apparatus 20 provided in a certain flight vehicle 10 is less than or equal to a threshold value, then interference such as that shown in FIG. 4(a) will occur if flight vehicle 10 having radio communication apparatus 20 flies in that airspace. As a result, there is a possibility of negatively influencing the physical uplink channel of ground-based radio communication apparatus 30 that is connected to either one of such radio base stations 40. In view of this, assignment unit 53 suppresses such interference in that airspace by limiting the assignment of flight vehicle 10 having radio communication apparatus 20 that would cause such interference.

Figure 6:
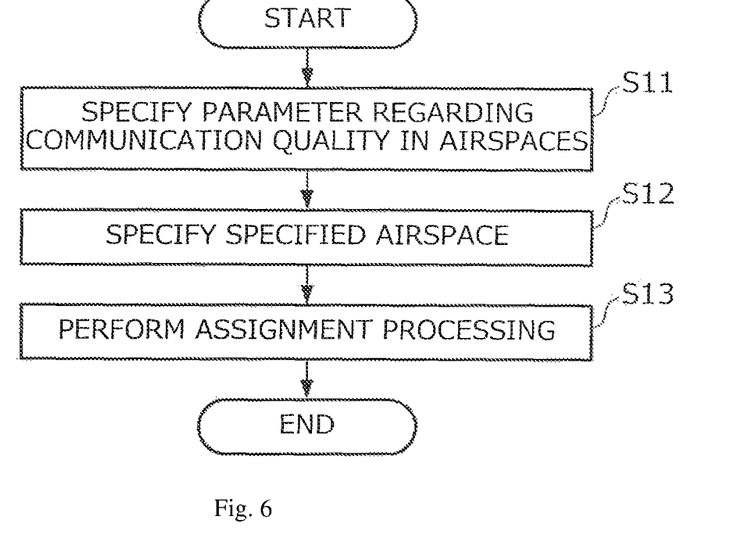
FIG. 6 is a flowchart showing an example of operations of flight vehicle management apparatus 50, in accordance to the present invention.

The following describes operations in the present embodiment. In FIG. 6, for each airspace, specification unit 52 specifies a parameter regarding the communication quality of radio communication apparatus 20 in the cell formed by the corresponding radio base station 40 (step S11). As previously described, this parameter is the path loss of the physical downlink channel from radio base station 40 to radio communication apparatus 20, for example. As a specific example of a specification method, flight vehicles 10 having radio communication apparatuses 20 are experimentally caused to fly and cover all of the airspaces, such radio communication apparatuses 20 are caused to acquire the path loss of the physical downlink channel in the airspaces, and that information is collected. As another method, a simulation is performed based on the position and size of the cell of each radio base station 40, map information, and a predetermined wave propagation model, and the path loss of the physical downlink channel is measured in each airspace.

Assignment unit 53 specifies an airspace in which the parameter specified by specification unit 52 is in a predetermined range as a specified airspace (step S12). Specifically, assignment unit 53 specifies an airspace in which the path loss of the physical downlink channel to radio communication apparatus 20 of flight vehicle 10 is less than or equal to a threshold value, as a specified airspace. As shown in the schematic illustration in FIG. 7(a), this specified airspace is an airspace A in which, when radio communication apparatus 20 provided in flight vehicle 10 is connected to radio base station 40, radio communication apparatus 20 exerts negative influence on the physical uplink channel of ground-based radio communication apparatus 30 that is connected to that radio base station 40.

Then, in accordance with desired flight content that was requested in advance by the operators of flight vehicles 10, for each airspace, assignment unit 53 assigns flight vehicles 10 that are to fly in the airspace, and creates flight plans that include flight paths, flight periods, and the like (step S13). The flight plans are stored in tracking unit 51.

At this time, assignment unit 53 limits the assignment of flight vehicles 10 to the above-described specified airspace. This assignment limiting will be described in detail below.

Operation Example 1 of Assignment Limiting

In Operation Example 1, assignment unit 53 assigns flight vehicles 10 that have a function for limiting the transmit power of the physical uplink channel to radio base stations 40 (interference avoidance function) to a specified airspace and other airspaces, and does not assign flight vehicles 10 that do not include the interference avoidance function to the specified airspace. In other words, in the case of the specified airspace, assignment unit 53 assigns flight vehicles 10 that include radio communication apparatus 20 having a function for avoiding interference, and in the case of airspaces other than the specified airspace, assigns flight vehicles 10 to such airspaces regardless of whether or not they have the interference avoidance function. Here, "radio communication apparatus 20 having a function for avoiding interference" is radio communication apparatus 20 that has any of a function for controlling the transmit power within a maximum transmit power range that was individually set for radio communication apparatus 20, a function for controlling the transmit power within a maximum transmit power range that was set for each type of radio communication apparatus 20, and a function of controlling the transmit power within a maximum transmit power range that changes according to the communication quality of radio communication apparatus 20. As long as flight vehicle 10 that includes radio communication apparatus 20 having such a function is assigned to the specified airspace, the transmit power will not be set excessively high in order to satisfy a high Target SIR, thus suppressing negative influence such as that shown in the example in FIG. 4(a).

In Operation Example 1, radio base station 40 controls the transmit power of the physical uplink channel used for transmission by radio communication apparatus 20. Specifically, radio base station 40 gives radio communication apparatus 20 instructions regarding the transmit power of the physical uplink channel, and radio communication apparatus 20 controls the transmit power of the physical uplink channel in accordance with the instructions. Note that although the following description is given by way of example of PUSCH, similar control is executed for other channels as well.

Figure 8:
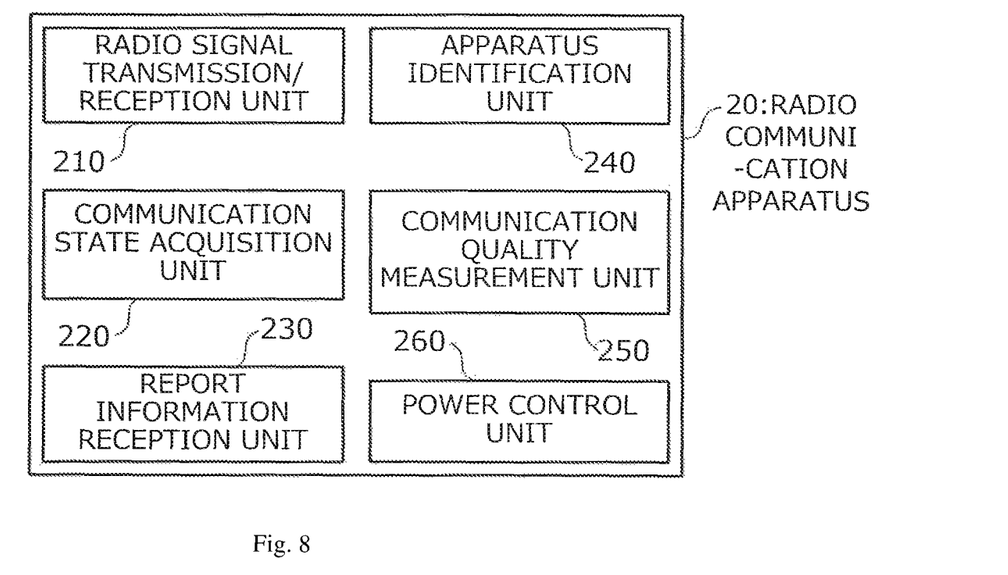
FIG. 8 is a block diagram showing the functional configuration of radio communication apparatus 20 in Operation Example 1 of assignment limiting, in accordance to the present invention.
Figure 9:
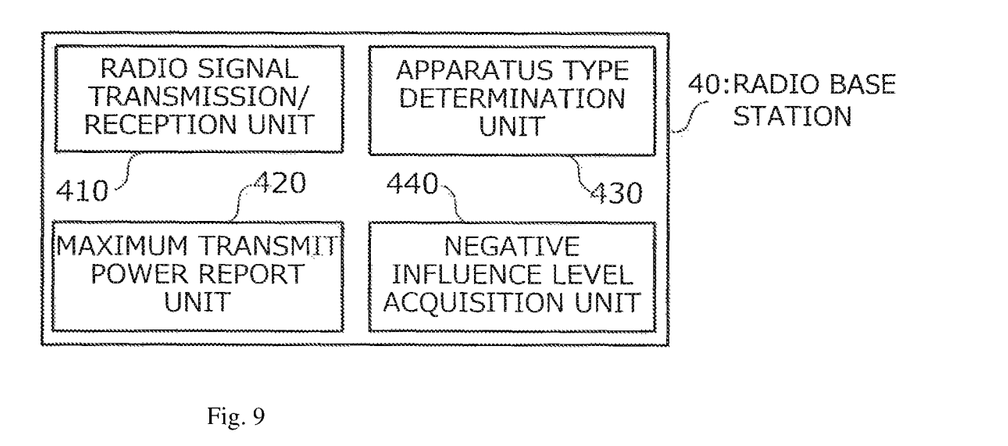
FIG. 9 is a block diagram showing the functional configuration of radio base station 40 in Operation Example 1 of assignment limiting, in accordance to the present invention.

FIG. 8 is a block diagram showing the functional configuration of radio communication apparatus 20 having the above-described function in Operation Example 1. FIG. 9 is a block diagram showing the functional configuration of radio base station 40 in Operation Example 1. As shown in FIG. 8, radio communication apparatus 20 includes radio signal transmission/reception unit 210, communication state acquisition unit 220, report information reception unit 230, apparatus identification unit 240, communication quality measurement unit 250, and power control unit 260.

Radio signal transmission/reception unit 210 exchanges radio signals with radio base station 40. Specifically, radio signal transmission/reception unit 210 performs transmission and reception on various types of physical channels (control channels and shared channels) in compliance with the LTE standard.

Communication state acquisition unit 220 acquires the communication state of the radio communication system, which includes the reception state of radio communication apparatus 20. Specifically, communication state acquisition unit 220 acquires the extent of negative influence (hereinafter called the negative influence level) in a group of cells that includes the cell of radio base station 40 to which radio communication apparatus 20 is connected. Here, the interference level, which indicates the interference power and can be measured by the radio base station, is used as the negative influence level. More specifically, communication state acquisition unit 220 acquires this interference level from radio base station 40 to which radio communication apparatus 20 is connected. Communication state acquisition unit 220 also acquires a parameter regarding the communication quality of radio communication apparatuses 20 in the group of cells. Specifically, communication state acquisition unit 220 acquires the path loss of the physical downlink channel to radio base station 40 to which radio communication apparatus 20 is connected, as well as radio base stations 40 in the vicinity thereof. Note that communication state acquisition unit 220 may acquire the RSRP (Reference Signal Received Power), which can be a determination index similar to the path loss, for example.

Report information reception unit 230 receives report information via connection-partner radio base station 40, for example. Specifically, report information reception unit 230 receives an RRC message that includes an MIB (Master Information Block) and an SIB (System Information Block) from radio base station 40. For example, report information reception unit 230 acquires the "type maximum value" of the transmit power included in the report information. The type maximum value is the maximum value of the transmit power of the PUSCH that is to be set for each type of radio communication apparatus 20. The type maximum value is set for types of radio communication apparatuses 20 that can possibly execute communication in the sky.

Apparatus identification unit 240 identifies the type of radio communication apparatus 20. Apparatus identification unit 240 identifies whether or not radio communication apparatus is radio communication apparatus 20 that can possibly execute communication in the sky. More specifically, apparatus identification unit 240 (i) performs identification with use of the IMEISV (International Mobile Equipment Identity Software Version) or contract type information of radio communication apparatus 20, (ii) performs identification based on separation of the connected APN (Access Point Name), and (iii) performs identification based on a measurement report from radio communication apparatus 20.

Communication quality measurement unit 250 measures the communication quality of radio communication apparatus 20. Specifically, communication quality measurement unit 250 measures the Reference Signal Received Power (RSRP) and the Reference Signal Received Quality (RSRQ) as the reception communication quality of reference signals (RS) transmitted by radio base stations 40. Communication quality measurement unit 250 also measures the path loss with respect to the downstream direction from radio base stations 40.

Power control unit 260 controls the transmit power of the physical uplink channel (PUSCH, PUCCH, or the like) used for transmission by radio signal transmission/reception unit 210. Specifically, power control unit 260 limits the transmit power if the interference levels or the communication qualities of cells acquired by communication state acquisition unit 220 are in a predetermined range (e.g., if the path loss of the physical downlink channel is less than or equal to a threshold value). Specifically, power control unit 260 limits the transmit power of the PUSCH to a threshold value or lower if the interference levels in cells are in a predetermined range (e.g., x dBm). For example, if the interference level in one cell is −80 dBm, the interference level in another cell is −85 dBm, and the predetermined range is 10 dBm, then power control unit 260 limits the transmit power of the PUSCH to the threshold value or lower. In the case of path loss as well, power control unit 260 limits the transmit power of the PUSCH to a threshold value or lower if path losses are similarly in a predetermined range (e.g., y dB).

Also, power control unit 260 receives "individual maximum value", which is the maximum value of the transmit power that is to be set in radio communication apparatus 20. The individual maximum value is the maximum value of the transmit power of the PUSCH that can be set for an individual radio communication apparatus 20. In other words, the individual maximum value is the maximum value of the transmit power of the PUSCH that is to be set individually for each radio communication apparatus 20. Power control unit 260 limits the transmit power based on the received individual maximum value.

Furthermore, power control unit 260 can limit the transmit power of the PUSCH based on the type maximum value included in the report information acquired by report information reception unit 230. Note that if both an individual maximum value and a type maximum value have been set, either one of them (e.g., the individual maximum value) may be applied with priority.

Power control unit 260 can determine whether or not to limit the transmit power of the PUSCH based on the reception communication quality measurement result obtained by communication quality measurement unit 250. Specifically, power control unit 260 can limit the transmit power if the RSRP is greater than or equal to a first threshold value, and the RSRQ is less than or equal to a second threshold value.

Power control unit 260 can also limit the transmit power if apparatus identification unit 240 has identified that radio communication apparatus 20 is provided in flight vehicle 10. In other words, if apparatus identification unit 240 has identified that radio communication apparatus 20 is provided in flight vehicle 10, power control unit 260 limits the transmit power even if the reception communication quality or the like does not satisfy the condition for limiting the transmit power.

Also, as shown in FIG. 9, radio base station 40 includes radio signal transmission/reception unit 410, maximum transmit power report unit 420, apparatus type determination unit 430, and negative influence level acquisition unit 440.

Radio signal transmission/reception unit 410 exchanges radio signals with radio communication apparatuses 20 and 30. Specifically, radio signal transmission/reception unit 410 transmits and receives signal waves on various types of physical channels (control channels and shared channels) in compliance with the LTE standard.

Maximum transmit power report unit 420 reports the above-described individual maximum value and type maximum value to radio communication apparatus 20. As previously described, the individual maximum value is the maximum value of the transmit power of the PUSCH that can be set for an individual radio communication apparatus. Also, the type maximum value is the maximum value of the transmit power of the PUSCH that is to be set for each type of radio communication apparatus. Specifically, maximum transmit power report unit 420 can include the individual maximum value in an RRC message (e.g., RRC Connection setup or RRC Connection re-establishment setup) that is transmitted to radio communication apparatus 20. Maximum transmit power report unit 420 can also transmit report information that includes the type maximum value (e.g., an SIB). The SIB is reported to radio communication apparatus 20 with use of an RRC message.

Apparatus type determination unit 430 determines the type of radio communication apparatus 20 that has become connected to radio base station 40. Specifically, similarly to previously-described apparatus identification unit 240, apparatus type determination unit 430 can determine the type of radio communication apparatus 20 based on the IMEISV, contract type information, or the like of radio communication apparatus 20. Apparatus type determination unit 430 then notifies maximum transmit power report unit 420 of the result of determining the type of radio communication apparatus 20. Such information is used when setting the type maximum value.

Negative influence level acquisition unit 440 acquires the interference levels (i.e., negative influence levels) in a group of cells that includes its own cell, that is to say the interference levels (negative influence levels) in its own cell and neighboring cells. Specifically, negative influence level acquisition unit 440 periodically measures the interference power in the group of cells for example, and exchanges information indicating the neighboring cells and the interference levels thereof. Negative influence level acquisition unit 140 then notifies the acquired interference levels (interference powers) to maximum transmit power report unit 120. Such information is used when setting and changing the individual maximum value.

Figure 4:
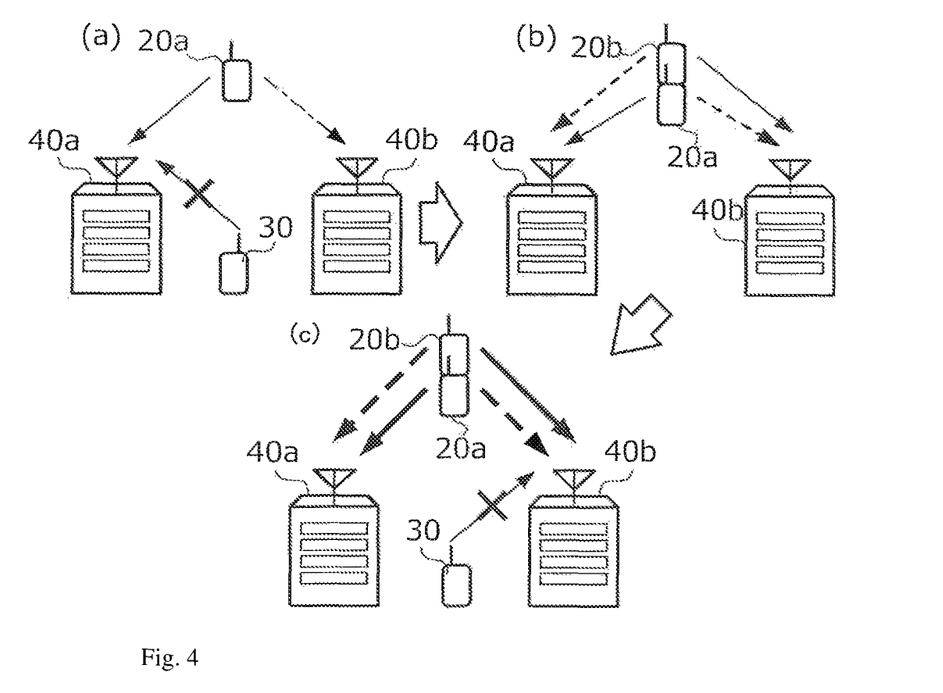
FIGS. 4(a)-4(c) are diagrams illustrating causes of interference, in accordance to the present invention.

According to the above-described configuration, radio communication apparatus 20 limits the transmit power of the physical uplink channel, or more specifically the physical uplink shared channel (PUSCH). For example, in the case of using the interference level or the reception communication quality as the reference, radio communication apparatus 20 acquires the interference level (interference power) in a group of cells (its own cell and neighboring cells), or the reception communication quality (path loss) of radio communication apparatus 20 in the group of cells. Radio communication apparatus 20 then determines whether or not the interference levels or the reception communication qualities in the group of cells are in a predetermined range. Specifically, radio communication apparatus 20 determines whether or not the interference levels in the group of cells are in a predetermined range (e.g., x dBm), or whether the path losses in the group of cells are in a predetermined range (e.g., y dB). If the interference levels or the path losses in the group of cells are in the predetermined range, radio communication apparatus 20 calculates a limitation value for the transmit power of the PUSCH. Accordingly, radio communication apparatus 20 recognizes that it is a radio communication apparatus provided in flight vehicle 10. Note that the above-described individual maximum value or type maximum value can be used as the specific limitation value for the transmit power. Radio communication apparatus 20 then controls the transmit power based on the calculated limitation value. Accordingly, the transmit power of the physical uplink channel from radio communication apparatus 20 shown in FIG. 4(*a*) is suppressed, and as a result, the influence of signal waves on radio base stations 40 is suppressed.

The following describes an example of operations in the case of using the individual maximum value. Radio communication apparatus 20 receives an RRC message that include an individual maximum value from radio base station 40. Radio communication apparatus 20 can recognize whether it is a radio communication apparatus provided in flight vehicle 10 based on whether or not an individual maximum value for the PUSCH transmit power is included. Radio communication apparatus 20 calculates a limitation value for the PUSCH transmit power based on the received individual maximum value. Radio communication apparatus 20 then controls the transmit power based on the calculated limitation value. Specifically, radio communication apparatus 20 executes communication without exceeding a maximum transmit power that is defined based on the individual maximum value. Note that conceivable opportunities for notification of the individual maximum value include outbound communication from radio communication apparatus 20, inbound communication to radio communication apparatus 20, handover, reconnection, return to Non-DRX (Discontinuous Reception) state, and the point at which the above-described interference level exceeds a threshold value (point at which the individual maximum value will be set again), for example. Also, the individual maximum value can be notified with use of the above-described RRC Connection setup or RRC Connection Re-establishment setup, or also HO Command through the execution of an intra-cell handover (Intra-cell HO). Furthermore, the individual maximum value may be acquired from an external device by radio base station 40 via network 90, or may be directly acquired from an external device by radio communication apparatus 20. Also, the individual maximum value may be changed according to the path loss value of the physical downlink channel. For example, A dBm is used if path loss (dB)≤X1, and B dBm is used if X1<path loss≤X2. Alternatively, radio base station 40 may define the individual maximum value as A*path loss+B (where A and B are variables), and set A and B depending on the situation for example. Furthermore, in regards to the display format, the maximum transmit power value (e.g., 20 dBm) may be directly displayed as the individual maximum value, or a configuration is possible in which a default maximum transmit power value is defined in advance, and the difference from that maximum transmit power value is displayed as the individual maximum value (e.g., if the default is 23 dBm, and the maximum transmit power value is 20 dBm, then −3 dB is displayed).

The following describes an example of operations in the case of using the type of radio communication apparatus 20. If radio communication apparatus 20 is a radio communication apparatus 20 provided in flight vehicle 10, radio communication apparatus 20 receives report information (SIB or the like), and acquires a type maximum value for the PUSCH transmit power. Radio communication apparatus 20 calculates a limitation value for the PUSCH transmit power based on the received type maximum value. Radio communication apparatus 20 then controls the transmit power based on the calculated limitation value. Specifically, radio communication apparatus 20 executes communication without exceeding a maximum transmit power that is defined based on the type maximum value. Note that conceivable opportunities for changing the type maximum value include the report information transmission timing, and the point at which the above-described interference level exceeds a threshold value, for example. Multiple threshold values may be used for the interference level, and the type maximum value may be changed in accordance with an interference level value exchanged between neighboring cells. Furthermore, a configuration is possible in which the higher the interference level (interference power) is, the smaller the type maximum value is set. Similarly to the individual maximum value, the type maximum value may be acquired from an external device by radio base station 40 via network 90, or may be directly acquired from an external device by radio communication apparatus 20. Also, the identification of whether or not radio communication apparatus 20 is radio communication apparatus 20 provided in flight vehicle 10 may be standardized in 3GPP with use of the capability of the radio communication apparatus (UE). Furthermore, if the type maximum value is standardized, a fixed value may be set in radio communication apparatus 20 without using report information.

The following describes an example of operations in the case of using a measured quality as a reference. Radio communication apparatus 20 measures the reception communication quality of radio communication apparatus 20. Specifically, radio communication apparatus 20 measures the RSRP and the RSRQ. Also, radio communication apparatus 20 may acquire the path loss, the detected cell count, and the uplink PHR (Power Head Room). Radio communication apparatus 20 then calculates the limitation value for the PUSCH transmit power based on the measured reception communication quality. Radio communication apparatus 20 then controls the transmit power based on the calculated limitation value. In other words, radio communication apparatus 20 sets the maximum transmit power in accordance with the result of reception communication quality measurement. For example, radio communication apparatus 20 determines whether or not to limit the transmit power, based on the RSRP value and the RSRQ value. If the RSRP is greater than or equal to a first threshold value (TH1), and the RSRQ is less than or equal to a second threshold value (TH2), radio communication apparatus 20 limits the transmit power. This is because in the sky, there is a tendency for the RSRP to be high, and for the RSRQ to be low. Also, in the case of controlling the transmit power based on a measured quality reference, the transmit power is controlled in accordance with the reception communication quality, without the application of the above-described individual maximum value or type maximum value (note that the default maximum transmit power value is defined in 3GPP standards). Also, similarly to the individual maximum value, the maximum transmit power value may be changed according to the path loss value of the physical downlink channel. Note that radio communication apparatus 20 may notify radio base station 40 of the fact that radio communication apparatus 20 is limiting the transmit power in accordance with the reception communication quality. Also, even if radio communication apparatus 20 notifies radio base station 40 that transmit power limiting is being executed, radio base station 40 may instruct radio communication apparatus 20 to cancel such limiting.

Operation Example 2 of Assignment Limiting

Figure 7:
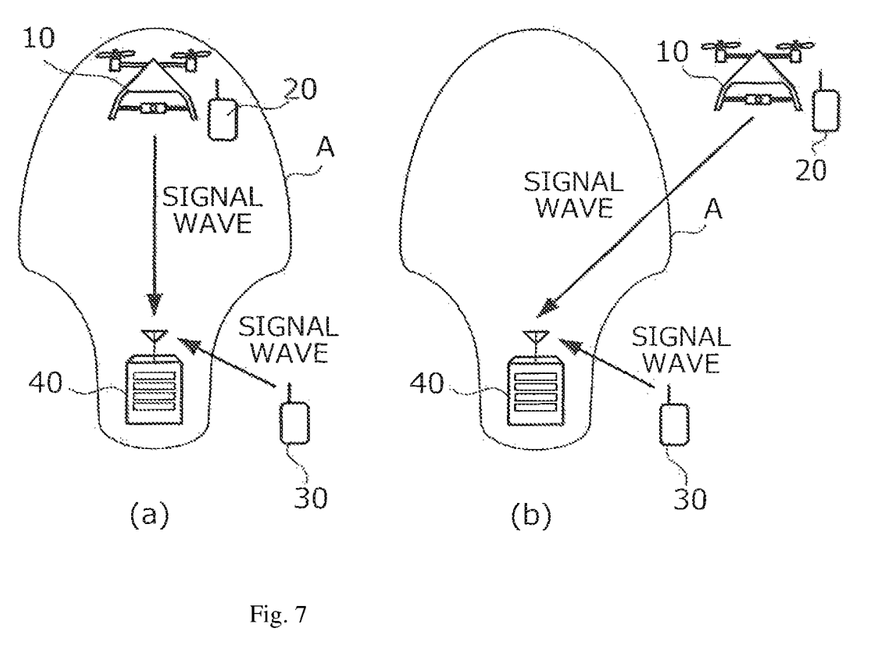
FIGS. 7(a) and 7(b) are diagrams illustrating an example of the positional relationship that a specified airspace has with radio base stations 40 and radio communication apparatus 30, in accordance to the present invention.

In Operation Example 2, radio communication apparatus 20 does not include an interference avoidance function such as that in Operation Example 1. In Operation Example 2, assignment unit 53 of flight vehicle management apparatus 50 sets the number of flight vehicles 10 that are assigned to a specified airspace smaller than the number of flight vehicles that are assigned to an airspace other than the specified airspace. For example, assignment unit 53 sets U1 as the upper limit number of flight vehicles 10 that are assigned per unit volume of a specified airspace, and sets U2 as the upper limit number of flight vehicles that are assigned per unit volume of an airspace other than the specified airspace (U1<U2). The minimum value of U1 is 0. Assignment unit 53 assigns flight vehicles 10 to airspaces by writing flight plans to tracking unit 51, in which the identification information of flight vehicles 10 are associated with the identification information of airspaces for flight of such flight vehicles 10 in accordance with the above-described upper limits. Accordingly, as shown in FIG. 7(*b*), flight vehicle 10 is assigned to an airspace in which the influence of signal waves on the physical uplink channel from radio communication apparatus 20 is small (an airspace other than specified airspace A).

According to the embodiment described above, it is possible to suppress the case where communication performed by ground-based radio communication apparatus 30 is negatively influenced when ground-based radio communication apparatus 30 and radio communication apparatus 20 provided in flight vehicle 10 are connected to the same radio base station 40.

Variations

The present invention is not limited to the embodiment described above. The above-described embodiment may be modified as described below. Also, two or more of the following variations may be implemented in combination with each other.

Variation 1

In the case of a cell that includes a specified airspace and is a cell in which the parameter specified by specification unit 52 is in the predetermined range (e.g., the path loss value of the physical downlink channel is less than or equal to a threshold value), assignment unit 53 may relax the limiting of assignment of flight vehicles 10 if the number of, or the communication load of, radio communication apparatuses 30 located in the cell is less than or equal to a threshold value. If the condition that a cell that includes a specified airspace has few or no ground-based radio communication apparatuses 30 located therein, or that the communication load of thereof is low or zero, is satisfied, radio communication apparatus 20 may be assigned to the specified airspace regardless of whether or not it has the above-described function. Such processing corresponds to relaxing the limiting of assignment of flight vehicles 10. Note that a configuration is possible in which consideration is not given to the number of, or the communication load of, radio communication apparatuses 30 that are located in the cell formed by radio base station 40 to which radio communication apparatus 20 provided in flight vehicle 10 is connected.

Also, a configuration is possible in which assignment unit 53 sets a higher number of radio communication apparatuses 20 that are assigned to an interference airspace when the above-described condition is satisfied than when the condition is not satisfied. Also, a configuration is possible in which in the case where the number of, or the communication load of, radio communication apparatuses 30 that are located in a cell that includes an interference airspace is less than or equal to a threshold value, assignment unit 53 eliminates the interference airspace or reduces the size thereof, or raises the threshold value for the path loss in that airspace. Accordingly, the interference airspace will be reduced in size.

Note that assignment unit 53 may detect the situation where the number of, or the communication load of, radio communication apparatuses 30 that are located in a cell that includes an interference airspace is less than or equal to a threshold value, by, similarly to the parameter specification performed by specification unit 52, causing radio communication apparatuses 20 of flight vehicles 10 to acquire the path loss of the physical downlink channel in the corresponding airspaces, and collecting such information, or may detect the aforementioned situation based on the positions and the sizes of the cells of radio base stations 40, as well as map information and a predetermined wave propagation model.

Variation 2

Assignment unit 53 may relax the limiting of the assignment of flight vehicle 10 in a specified period that has been set for each airspace. For example, during the nighttime in an interference airspace, there is a high possibility that the number of, or the communication load of, radio communication apparatuses 30 located in cells that include the interference airspace is less than or equal to a threshold value, and therefore radio communication apparatus 20 may be assigned to the interference airspace regardless of whether or not it has an interference avoidance function. Also, a configuration is possible in which assignment unit 53 sets a higher number of radio communication apparatuses 20 that are assigned to an interference airspace when in a specified period than when not in the specified period. Also, a configuration is possible in which when in the specified period, assignment unit 53 eliminates the interference airspace or reduces the size thereof, or raises the threshold value for the path loss in that airspace. Accordingly, the size of the interference airspace will be reduced in the specified period.

Variation 3

Specification unit 52 may specify an airspace of interest as a specified airspace based on the number of flight vehicles 10 that have been assigned by assignment unit 53 to another neighboring airspace. This is because, if a high number of flight vehicles 10 have been assigned to the other neighboring airspace, there is a high possibility that the airspace of interest is a specified airspace due to the influence of those flight vehicles 10.

Variation 4

When performing assignment limiting, assignment unit 53 may weight flight vehicles 10 in accordance with a parameter regarding the communication quality of radio communication apparatuses 30 provided in those flight vehicles 10. Specifically, letting X be the path loss of the physical downlink channel from radio base station 40a in first radio communication apparatus 30, and letting Y be the path loss of the physical downlink channel from radio base station 40a in second radio communication apparatus 30 (X>Y, and both X and Y are less than or equal to the above-described threshold value), second radio communication apparatus 30 exerts more influence than first radio communication apparatus 30, and therefore assignment unit 53 sets 1.1 as the weight value for the number of second radio communication apparatuses 30, and sets 1.0 as the weight value for the number of first radio communication apparatuses 30, for example, such that the number of second radio communication apparatuses 30 is given more weight than the number of first radio communication apparatuses 30 when assigning a flight vehicle to a specified airspace.

Variation 5

Assignment unit 53 may relax the limiting of the assignment of flight vehicles 10 if radio communication apparatus 20 provided in flight vehicle 10 is to perform communication that requires urgency in a specified airspace. For example, if radio communication apparatus 20 provided in flight vehicle 10 needs to transmit positioning information to a predetermined external apparatus immediately after the measurement, assignment unit 53 assigns that flight vehicle 10 to a specified airspace.

Variation 6

Assignment unit 53 may relax the limiting of the assignment of flight vehicle 10 in a specified airspace if it is an airspace in which radio communication apparatus 20 provided in flight vehicle 10 uses a different communication channel (e.g., Wifi (registered trademark)) than radio communication apparatus 30 that performs communication on the ground in the airspace. This is because there the problem of the above-described negative influence will not occur if radio communication apparatus 20 uses a different communication channel.

Variation 7

Assignment unit 53 may relax the limiting of the assignment of flight vehicle if the specified airspace is an airspace in which radio communication apparatus of flight vehicle is to perform communication that requires urgency, or an airspace through which flight vehicle has a high need to pass. For example, in the case where the airspace in which flight vehicle 10 takes off and lands is a specified airspace, radio communication apparatus 20 needs to transmit and receive various types of information necessary for take-off and landing, and therefore assignment unit 53 assigns that flight vehicle 10 to the specified airspace. Also, besides the case where the specified airspace is an airspace in which radio communication apparatus provided in flight vehicle is to perform communication that requires urgency, assignment unit 53 may relax the limiting if movement itself of flight vehicle requires urgency (e.g., if flight vehicle is flying in order to carry relief goods). In other words, assignment unit 53 may relax the limiting of the assignment of flight vehicles 10 to a specified airspace if urgency is required.

Variation 8

In the present invention, it is sufficient that radio communication apparatus 20 provided in flight vehicle 10 is an apparatus that performs communication that can exert the above-described negative influence, that is to say, performs communication using at least a physical uplink channel.

In other words, it is sufficient that an information processing system of the present invention executes a step of, for each of a plurality of airspaces, specifying the value of a parameter regarding the communication quality of radio communication apparatuses in cells formed by radio base stations, and a step of assigning flight vehicles that include a radio communication apparatus to airspaces, and that the assignment of a flight vehicle is limited in an airspace in which the specified parameter satisfies a predetermined condition. Note that there may be an airspace for which the number of assigned flight vehicles is zero.

The block diagrams used in the above description of the embodiments shows blocks in units of functions. These functional blocks (configuration units) are realized by any combination of hardware and/or software. Furthermore, there are no particular limitations on the means for realizing the functional blocks. In other words, the functional blocks may be realized by one physically and/or logically combined apparatus, or a plurality of physically and/or logically separated apparatuses that are connected directly and/or indirectly (for example, in a wired and/or wireless manner).

Although the LTE standard is described as an example in the above embodiment, the radio communication standard is not limited to this, and another standard such as 3G or 5G may be used. In other words, the aspects/embodiments described in the present description may be employed to a system that uses LTE (Long Term Evolution), LTE-A (LTE-Advanced), SUPER3G, IMT-Advanced, 4G, 5G, FRA (Future Radio Access), W-CDMA (registered trademark), GSM (registered trademark), CDMA2000, UMB (Ultra Mobile Broadband), IEEE802.11 (Wi-Fi), IEEE802.16 (WiMAX), IEEE802.20, UWB (Ultra-WideBand), or Bluetooth (registered trademark), a system that uses another appropriate system, and/or a next-generation system that is an extension of any of the same.

The orders in the processing procedures, sequences, flowcharts, and the like of the aspects/embodiments described in the present description may be changed as long as no contradictions arise. For example, the methods explained in the present description show various step elements in an exemplified order, and are not limited to the specific order that is shown. The aspects/embodiments described in the present description may also be used alone or in combination, or may also be switched when they are implemented. Furthermore, the notification of predetermined information (e.g., notification of "being X") is not limited to being performed explicitly, and may also be performed implicitly (for example, notification of the predetermined information is not performed).

The terms "system" and "network" used in the present description can be used in an interchangeable manner.

The information and the parameters described in the present description may also be expressed by absolute values, relative values with respect to a predetermined value, or another type of corresponding information. For example, a radio resource may also be one indicated by an index.

The names used for the above-described parameters are in no way limiting. Furthermore, there may be a case where formulae and the like using these parameters are different from those explicitly disclosed in the present description. Various channels (such as, for example, a PUCCH and a PDCCH) and information elements (such as, for example, a TPC) can be identified by any suitable name, and thus various names assigned to these various channels and information elements are no way limiting. For example, an example was described in which the function of the radio communication apparatus for controlling the transmit power is realized with use of an LTE channel, message, or parameter, but this function can be realized using a 3G or 5G equivalent channel, message, or parameter.

The term "determining" used in the present description may include various types of operations. The term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The present invention may be provided as a flight control method that includes the processing steps performed in flight control system 1 or flight vehicle management apparatus 50. Also, the present invention may be provided as a program for execution in flight vehicle 10 or flight vehicle management apparatus 50. This program may be provided in an aspect of being recorded on a recording medium such as an optical disk, or may be provided in an aspect of being downloaded to a computer via a network such as the Internet and being installed in the computer to become usable, for example.

Software, instructions, and the like may also be transmitted/received via a transmission medium. For example, if software is transmitted from a web site, a server, or another remote source using a wired technology such as a coaxial cable, an optical fiber cable, a twisted-pair wire, or a digital subscriber line (DSL), and/or a wireless technology using infrared light, radio waves, microwaves, or the like, the definition of the transmission medium will include the wired technology and/or the wireless technology.

Information, signals, and the like described in the present description may also be expressed using any of various different technologies. For example, data, an instruction, a command, information, a signal, a bit, a symbol, a chip, and the like that may be mentioned throughout the entire description above may also be expressed by an electric voltage, an electric current, an electromagnetic wave, a magnetic field or a magnetic particle, an optical field or a photon, or an arbitrary combination thereof.

Note that the terms described in the present description and/or the terms needed for understanding the present description may also be replaced by terms that have the same or similar meaning. For example, a channel and/or a symbol may also be a signal. Furthermore, a signal may also be a message. Furthermore, a component carrier (CC) may also be referred to as a carrier frequency, a cell, or the like.

All references to elements that have been given names such as "first" and "second" in the present description do not overall limit the number of such elements or the orders thereof. Such names may be used in the present description as a convenient method for distinguishing between two or more elements. Accordingly, references to first and second elements are not intended to mean that only two elements can be employed, or that the first element is required to come before the second element in some sort of manner.

The "means" in the configurations of the above-described apparatuses may be replaced by "unit", "circuit", "device", or the like.

The terms "including", "comprising", and other forms thereof are intended to be comprehensive as long as they are used in the present description or the claims, similar to the term "being provided with". Furthermore, the term "or" used in the present description or the claims is intended not to be exclusive OR.

In the entirety of the present disclosure, when articles are added through translation, for example, as "a", "an", and "the" in English, these articles also denote the plural form unless it is clear otherwise from the context.

While the present invention has been described in detail, it would be obvious to those skilled in the art that the present invention is not limited to the embodiments explained in the present description. The present invention can be implemented as corrected and modified aspects without departing from the spirit and scope of the present invention that are defined by the description of the claims. Accordingly, the present description aims to illustrate examples and is not intended to restrict the present invention in any way.

REFERENCE SIGNS LIST

1: flight control system
10: flight vehicle
20, 30: radio communication apparatus
201: CPU
202: ROM
203: RAM
204: auxiliary storage apparatus
205: communication IF
50: flight vehicle management apparatus
51: tracking unit
52: specification unit
53: assignment unit
501: CPU
502: ROM
503: RAM
504: auxiliary storage apparatus
505: communication IF

What is claimed is:

1. A flight vehicle management apparatus comprising:
a processor configured to:
specify, for each airspace, a parameter regarding a communication quality of a radio communication apparatus in a cell formed by a radio base station;
for each airspace, assign a flight vehicle including a radio communication apparatus as a flight vehicle that is to fly in the airspace, and to limit assignment of a flight vehicle to a specified airspace, the specified airspace being an airspace in which the specified parameter is in a predetermined range; and
control the flight of the flight vehicle based on the specified airspace assigned to the flight vehicle.

2. The flight vehicle management apparatus according to claim 1,
wherein the processor is configured to assign, to the specified airspace, a flight vehicle including a radio communication apparatus that has a function for limiting a transmit power of a physical uplink channel to a radio base station, and assigns a flight vehicle to an airspace other than the specified airspace regardless of whether or not the function is included.

3. The flight vehicle management apparatus according to claim 1,
wherein the processor is configured to limit the number of flight vehicles that are assigned to the specified airspace to a greater extent than the number of flight vehicles that are assigned to an airspace other than the specified airspace.

4. The flight vehicle management apparatus according to claim 1,
wherein in a case where the number of, or a communication load of, radio communication apparatuses located in a cell that includes the specified airspace is less than or equal to a threshold value, the processor is configured to relax the limiting of assignment of a flight vehicle or reduces the size of the specified airspace.

5. The flight vehicle management apparatus according to claim 1,
wherein the processor is configured to relax the limiting of assignment of a flight vehicle or reduces the size of the specified airspace in a specified period.

6. The flight vehicle management apparatus according to claim 1,
wherein the processor is configured to specify an airspace as the specified airspace based on the number of flight vehicles that have been assigned to another airspace in a vicinity of the airspace.

7. The flight vehicle management apparatus according to claim 1,
wherein when performing the assignment, the processor is configured to weigh a flight vehicle in accordance with a parameter regarding a communication quality of a radio communication apparatus of the flight vehicle.

8. The flight vehicle management apparatus according to claim 1,
wherein the processor is configured to relax the limiting of assignment of a flight vehicle to the specified airspace if the specified airspace is an airspace in which a radio communication apparatus of the flight vehicle can use a communication channel that is different from a radio communication apparatus that performs ground-based communication in the airspace.

9. The flight vehicle management apparatus according to claim 1,
wherein the processor is configured to relax the limiting of assignment of a flight vehicle to the specified airspace if urgency is required.

10. The flight vehicle management apparatus according to claim 1,
wherein the processor is configured to relax the limiting of assignment of a flight vehicle to the specified airspace if the specified airspace is an airspace through which the flight vehicle has a requirement to takeoff or land in the airspace.

* * * * *